United States Patent
Gay et al.

(10) Patent No.: US 10,484,579 B2
(45) Date of Patent: Nov. 19, 2019

(54) SYSTEMS AND METHODS TO OVERLAY REMOTE AND LOCAL VIDEO FEEDS

(71) Applicant: Disney Enterprises, Inc., Burbank, CA (US)

(72) Inventors: Michael F. Gay, Burbank, CA (US); Anthony Bailey, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 105 days.

(21) Appl. No.: 15/815,829

(22) Filed: Nov. 17, 2017

(65) Prior Publication Data
US 2018/0091706 A1    Mar. 29, 2018

Related U.S. Application Data

(63) Continuation of application No. 12/828,859, filed on Jul. 1, 2010, now abandoned.

(51) Int. Cl.
*H04N 5/222* (2006.01)
*H04N 5/272* (2006.01)
*H04N 9/75* (2006.01)

(52) U.S. Cl.
CPC ........... *H04N 5/2224* (2013.01); *H04N 5/272* (2013.01); *H04N 9/75* (2013.01)

(58) Field of Classification Search
None
See application file for complete search history.

(56) References Cited

U.S. PATENT DOCUMENTS

| | | | | |
|---|---|---|---|---|
| 5,566,251 | A * | 10/1996 | Hanna | H04N 5/272 348/588 |
| 6,476,874 | B1 * | 11/2002 | Ito | H04N 5/222 348/584 |
| 6,704,048 | B1 * | 3/2004 | Malkin | G06T 3/40 348/14.1 |
| 7,209,181 | B2 * | 4/2007 | Kriegman | G03B 15/10 348/239 |
| 7,623,176 | B2 * | 11/2009 | Hoshino | G11B 27/11 348/231.3 |
| 2006/0157640 | A1 * | 7/2006 | Perlman | H04N 5/2254 250/208.1 |
| 2010/0085416 | A1 * | 4/2010 | Hegde | H04N 7/147 348/14.08 |
| 2010/0245532 | A1 * | 9/2010 | Kurtz | G06K 9/00711 348/14.03 |
| 2010/0278450 | A1 * | 11/2010 | Derrenberger | H04N 5/272 382/284 |

(Continued)

*Primary Examiner* — Twyler L Haskins
*Assistant Examiner* — Wesley J Chiu
(74) *Attorney, Agent, or Firm* — McCormick, Paulding & Huber LLP

(57) ABSTRACT

According to some embodiments, a studio video feed, including a studio subject, may be received from a studio video camera. A remote video feed, including a remote subject, may be received from a remote video camera. The remote video feed may include, for example, the remote subject positioned in from of a solid-colored background. The remote subject may be overlaid into the studio video feed to produce a composite video signal, and at least one of the studio video feed and the remote video feed may be automatically adjusted to create an impression that the studio subject and the remote subject occupy a shared physical space.

27 Claims, 7 Drawing Sheets

(56) References Cited

U.S. PATENT DOCUMENTS

| | | | | |
|---|---|---|---|---|
| 2011/0117532 A1* | 5/2011 | Relyea | ................... | G01J 3/02 |
| | | | | 434/307 R |
| 2012/0081503 A1* | 4/2012 | Leow | ................... | H04N 7/142 |
| | | | | 348/14.07 |
| 2012/0314077 A1* | 12/2012 | Clavenna, II | ...... | H04N 21/2187 |
| | | | | 348/159 |

\* cited by examiner

| CAMERA ID | DISTANCE DATA | TILT DATA | |
|---|---|---|---|
| RC_01 | 12 FEET | 0 DEG | |
| LC_01 | 15 FEET | 10 DEG | |
| RC_02 | 35 FEET | 0 DEG | |
| LC_02 | 40 FEET | 5 DEG | |

*FIG. 6*

SYSTEMS AND METHODS TO OVERLAY REMOTE AND LOCAL VIDEO FEEDS

CROSS-REFERENCE TO RELATED APPLICATION

This application is a continuation of U.S. patent application Ser. No. 12/828,859, filed Jul. 1, 2010, which is hereby incorporated by reference in its entirety.

FIELD

The present invention relates to systems and methods to combine remote and local video signals. Some embodiments relate to systems and methods for efficiently overlaying remote and local video feeds.

BACKGROUND

A broadcast program might simultaneously include video information from two different physical locations. For example, the program might include videos of both (1) an interviewer (e.g., a program host located in a broadcast studio) and (2) a subject who is being interviewed (e.g., located at sports stadium remote from the broadcast studio). Typically, each video is displayed in a separate box on the broadcast display. For example, a first box might display the face of the interviewer (e.g., and the first box might be labeled "ESPN® Studios") while a second box might display the face of the subject who is being interviewed (and the second box might be labeled "Fenway Park"). In some cases, a "split-screen" display might be provided (e.g., with the left half displaying a studio video feed and the right half displaying a remote video feed). Such approaches, however, re-enforce the impression that the interviewer and subject are not occupying a shared physical space which can distract and/or disorient viewers.

BRIEF DESCRIPTION OF THE DRAWINGS

FIG. 6 is a tabular representation of a portion of a lookup table in accordance with some embodiments of the present invention.

DETAILED DESCRIPTION

Figure 1:
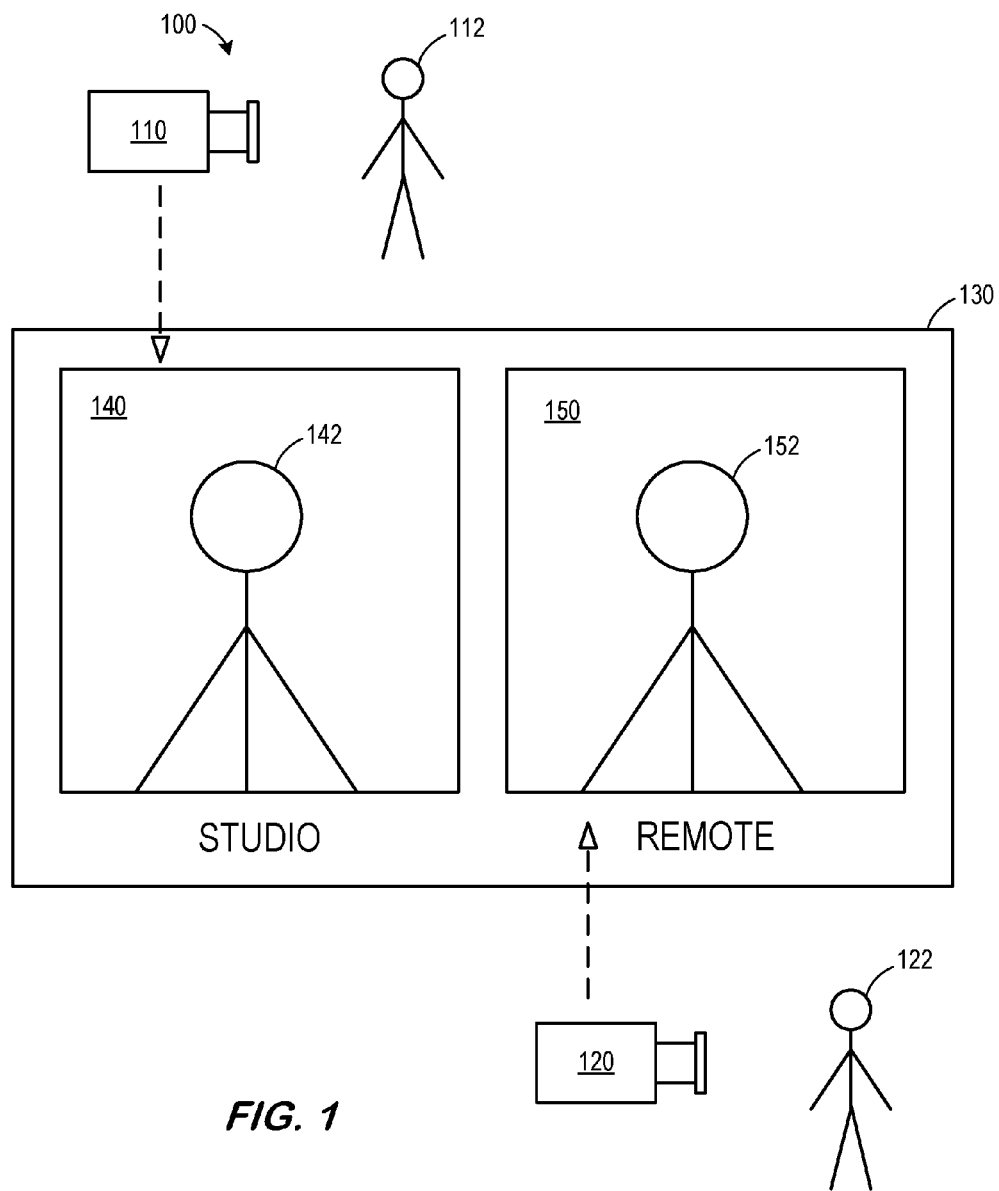
FIG. 1 is an illustration of a display including information from a local video camera and a remote video camera.

Applicants have recognized that there is a need for methods, systems, apparatus, means and computer program products to efficiently overlay remote and local video feeds. Note that a broadcast program might simultaneously include video information from two different physical locations. For example, FIG. 1 is an illustration 100 of a display 130 including a local video feed received from a local or "studio" video camera 110, the local video feed including a local subject 112 (e.g., the host of a program). The display 130 also includes a remote video feed, from a remote video camera 120, the remote video feed including a remote subject 122 (e.g., a person being interviewed by the host). In this example, an image 142 of the local subject 112 is displayed in a first box 140 labeled "Studio" while an image 152 of the remote subject 122 is displayed in a second box 150 labeled "Remote" on the display 130. Such an approach, however, re-enforces the impression that the local subject 112 and remote subject 122 are not occupying a shared physical space which can distract and/or disorient viewers.

Figure 2:
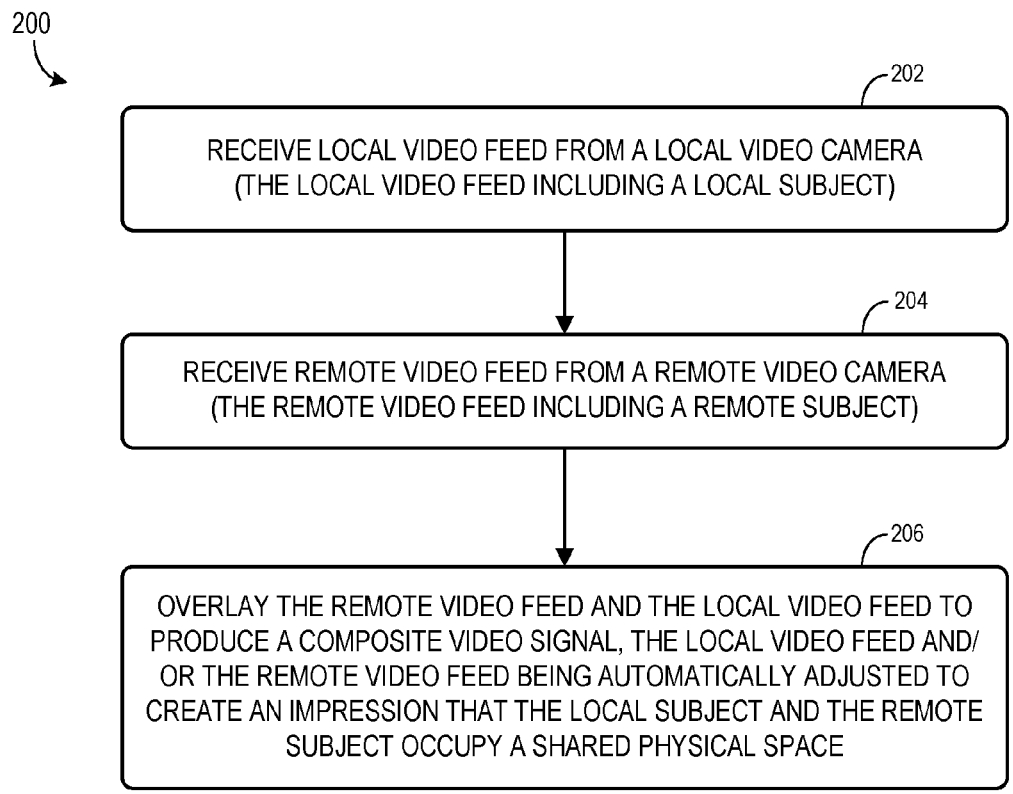
FIG. 2 is a flow chart of a method in accordance with some embodiments of the present invention.

To help avoid such a result, FIG. 2 illustrates a method that might be performed, for example, by some or all of the elements described herein. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 202, a local video feed is received from a local video camera, the local video feed including a local subject. As used herein, the phrase "video feed" may refer to any signal conveying information about a moving image, such as a High Definition-Serial Data Interface ("HD-SDI") signal transmitted in accordance with the Society of Motion Picture and Television Engineers 292M standard. Although HD signals may be described in some examples presented herein, note that embodiments may be associated with any other type of video feed, including a standard broadcast feed and/or a 3D image feed.

At 204, a remote video feed is received from a remote video camera, the remote video feed including a remote subject. The remote video feed might comprise, for example, an HD-SDI signal received through a fiber cable and/or a satellite transmission. According to some embodiments, the remote subject is situated in front of a solid-colored background (e.g., a "greenscreen").

Note that the local and remote video cameras may be any device capable of generating a video feed, such as a Vinten® studio (or outside) broadcast camera with a pan and tilt head. According to some embodiments, at least one of the local video camera and the remote video camera are an "instrumented" video camera adapted to provide substantially real-time information about dynamic adjustments being made to the instrumented video camera. As used herein, the phrase "dynamic adjustments" might refer to, for example, a panning motion, a tilting motion, a focal change, and/or a zooming adjustment being made to a video camera (e.g., zooming the camera in or out).

At 206, the remote video feed and the local video feed are overlaid to produce a composite video signal, wherein at least one of the local video feed and the remote video feed are automatically adjusted to create an impression that the local subject and the remote subject occupy a shared physical space. For example, the remote video feed might be automatically adjusted based on dynamic adjustments being made to the local video feed (e.g., the local camera might be slowly panning across a studio set). As a result of the automatic adjustment, the overlaid video feeds may create the impression that the remote subject is sitting next to the local subject in a broadcast studio. As another example, the overlaid video feeds might instead create the impression that the local subject is standing next to the remote subject at a baseball stadium.

Figure 3:
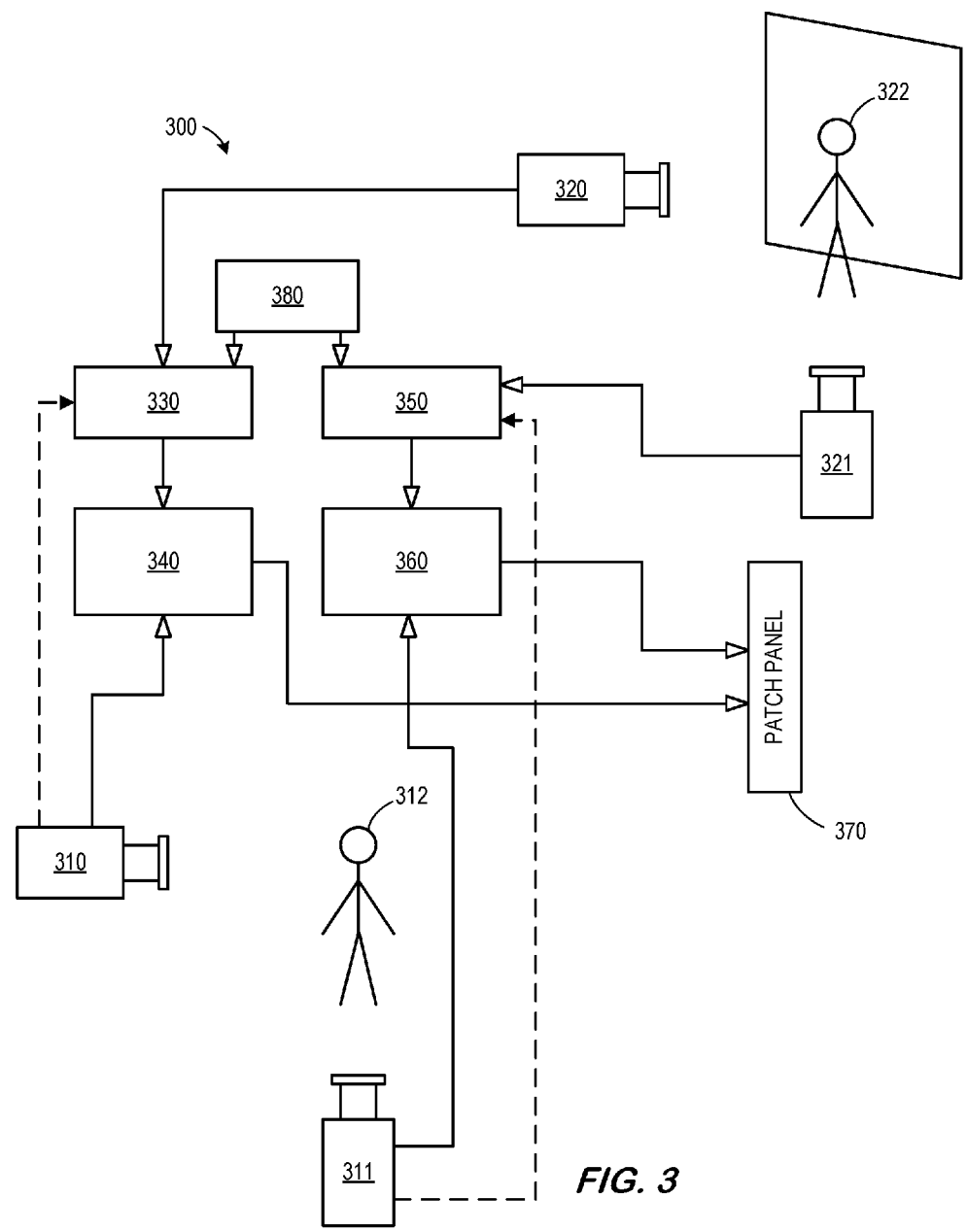
FIG. 3 is a block diagram of a system in accordance with some embodiments of the present invention.

FIG. 3 is a block diagram of a system 300 in accordance with some embodiments of the present invention. The system 300 includes a first local or studio camera 310 aimed at a local subject 312 from a first angle. The first local video camera 310 might comprise, for example, an instrumented hard camera that can be dynamically adjusted (e.g., via pan and/or tilt motions). The first local video camera 310 might provide information about such dynamic adjustments directly to a first Personal Computer ("PC") 330 via a serial interface and/or linked fiber transceivers. The first PC 330 might be executing a rendering application, such as the Brainstorm eStudio® 3D real-time graphics software package. Note that the rendering platform could instead be implemented using an Apple® computing platform.

Similarly, the system 300 may include a first remote video camera 320 aimed at a remote subject 322 (e.g., a guest standing in front of a greenscreen) from a first angle. The first remote video camera 320 might comprise, for example, a lockoff camera that transmits a remote video HD-SDI feed directly to the first PC 330 over a fiber or satellite connection. Note that the first PC 330 might be co-located with the first local video camera 310 or the first remote video camera 320 or may instead be implemented at an entirely different location.

The first PC 330 may automatically adjust the received remote video HD-SDI feed based on information about dynamic adjustments received from the first local video camera 310 (e.g., the image of the guest may be adjusted when the studio camera is tilted). As a result, the output of the first PC 330 may represent a tracked remote video foreground over greenscreen video signal that may be provided to a first overlay engine 340.

The first overlay engine 340 may also receive a local video HD SDI feed (including the studio background) directly from the first local video camera 310. The first overlay engine 340 may then combine the two received video feeds to generate an output video feed that creates an impression that the local subject and the remote subject occupy a shared physical space. Note that according to some embodiments, the first PC 330 and the first overlay engine 340 may comprise a single device.

The system 300 may also include, according to some embodiments, a second local camera 311 aimed at the local subject 312 from a second angle (different than the first angle). The second local video camera 311 might comprise, for example, another instrumented hard camera that can be dynamically adjusted (e.g., via pan and/or tilt motions). The second local video camera 311 might provide information about such dynamic adjustments directly to a second PC 350 via a serial interface and/or linked fiber transceivers. The second PC 350 might also be executing a rendering application, such as the Brainstorm eStudio® 3D real-time graphics software package. Note that according to some embodiments, the first and second PCs 330, 350 may comprise a single device.

Figure 4:
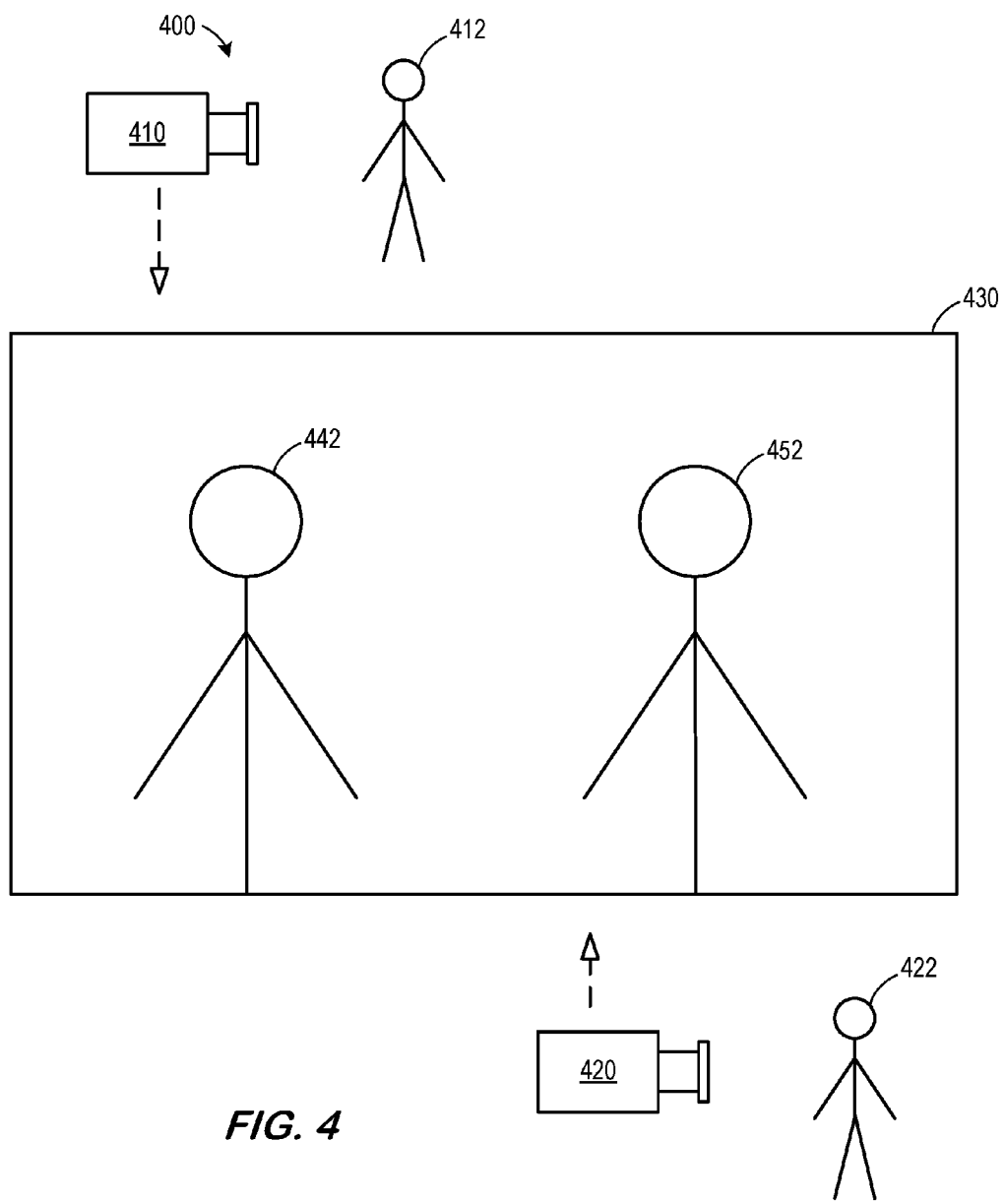
FIG. 4 is an illustration of a display including information from a local video camera and a remote video camera in accordance with some embodiments.

Consider, for example, FIG. 4 which is an illustration 400 of a display 430 including a local video feed received from a local or "studio" video camera 410, the local video feed including a local subject 412. The display 430 also includes a remote video feed, from a remote video camera 420, the remote video feed including a remote subject 422. In this example, an image 442 of the local subject 412 is displayed blended with an image 452 of the remote subject 422 to efficiently create the impression that the local subject 412 and remote subject 422 occupy a shared physical space.

Referring again to FIG. 3, according to some embodiments the system 300 may also include a second remote video camera 321 aimed at the remote subject 322 (e.g., a guest standing in front of a greenscreen) from a second angle. The second remote video camera 321 might comprise, for example, another camera that transmits a remote video HD-SDI feed directly to the second PC 350 over a fiber or satellite connection. The second PC 350 may automatically adjust the received remote video HD-SDI feed based on information about dynamic adjustments received from the second local video camera 311 (e.g., the image of the guest may be adjusted when the studio camera is tilted). As a result, the output of the second PC 350 may represent a tracked remote video foreground over greenscreen video signal that may be provided to a second overlay engine 360.

The second overlay engine 360 may also receive a local video HD SDI feed (including the studio background) directly from the second local video camera 311. The second overlay engine 360 may then combine the two received video feeds to generate an output video feed that creates an impression that the local subject and the remote subject occupy a shared physical space. The two composite outputs from the first and second overlay engines 340, 360 might be routed to a patch panel 370 (and either of the two angles might be selected for broadcast by an operator). According to some embodiments, the system 300 further includes a virtual operator station 380 that may facilitate interactions between an operator and the two PCs 330, 350.

The system 300 may therefore provide an ability to have remote guests/talent seamlessly immersed in a studio environment (or vice versa). For example, a remote guest might appear to be sitting in the studio location alongside a studio host in the same camera shot.

According to some embodiments, the locked-off remote interview feed (over greenscreen) is fed from the first remote video camera 320 to the Brainstorm application executing at the first PC 330 as an HD/SDI live input, which may be mapped to a tracked plane in a virtual environment. The tracked plane of video may then be keyed over the encoded and delayed studio camera shot from the first studio video camera 310 (e.g., equipped with an encoded jib associated with a virtual setup) by a switcher using a chroma keyer to complete the effect. Note that the operator of the first remote video camera 320 may provide to the rendering software information about the distance between his or her camera to the subject and/or help calibrate the field of view (e.g., the width of the shot at the remote subject's distance).

Figure 5:
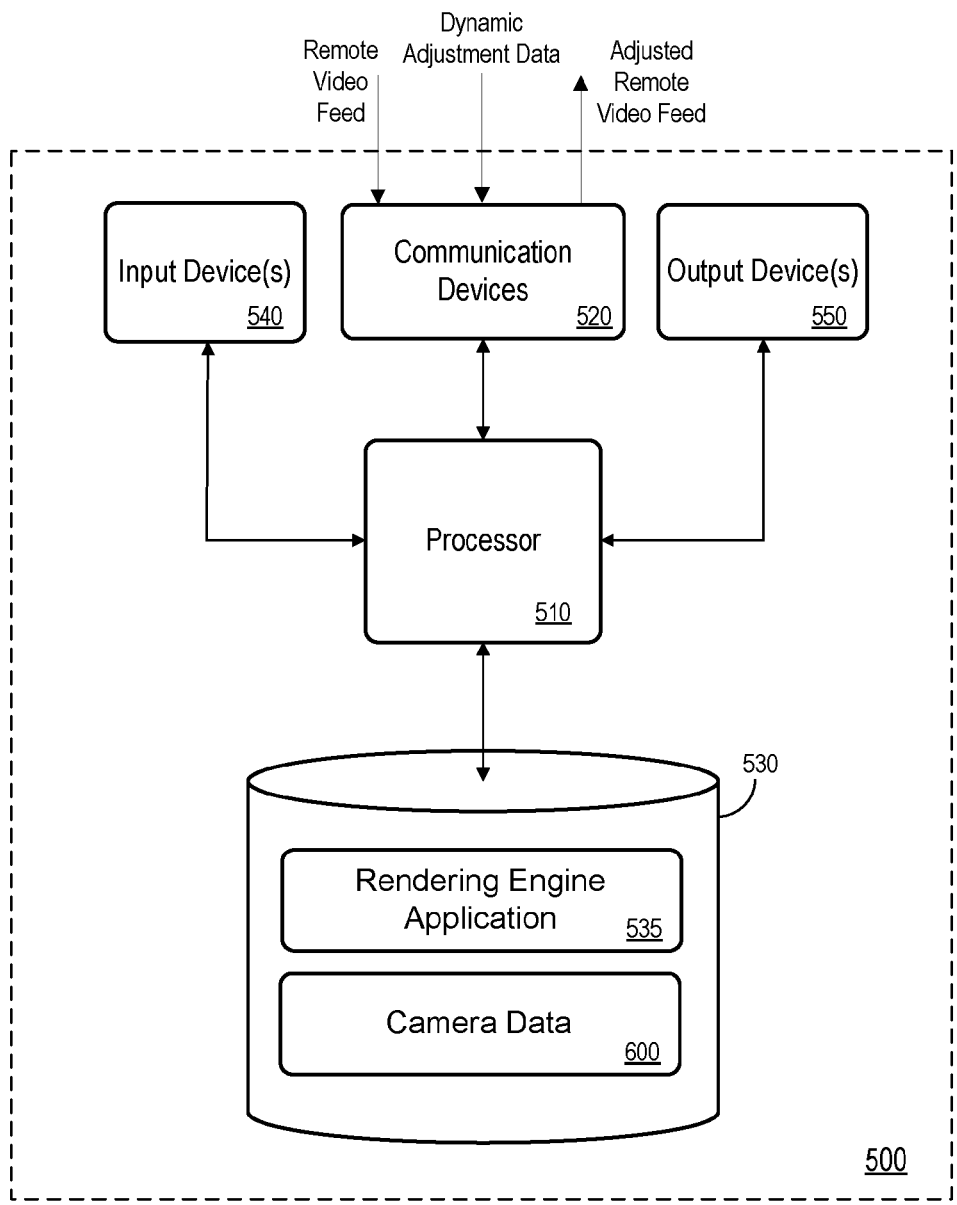
FIG. 5 is a block diagram of a rendering engine in accordance with some embodiments of the present invention.

FIG. 5 is a block diagram of a rendering engine 500, such as an engine executing on the first or second PCs 330, 350 of FIG. 3, in accordance with some embodiments of the present invention. The rendering engine 500 comprises a processor 510, such as one or more INTEL® Pentium® processors, coupled to communication devices 520 configured to communicate with remote devices (not shown in FIG. 5). The communication devices 520 may be used, for example, to receive a remote video feed along with dynamic adjustment information about a local video camera and to transmit an adjusted remote video feed.

The processor 510 is also in communication with an input device 540. The input device 540 may comprise, for example, a keyboard, a mouse, or computer media reader. Such an input device 540 may be used, for example, to enter information about a remote and/or studio camera set-up. The processor 510 is also in communication with an output device 550. The output device 550 may comprise, for example, a display screen or printer. Such an output device 550 may be used, for example, to provide information about a remote and/or studio camera set-up to an operator.

The processor 510 is also in communication with a storage device 530. The storage device 530 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices.

The storage device 530 stores a rendering engine application 535 for controlling the processor 510. The processor 510 performs instructions of the application 535, and thereby operates in accordance any embodiments of the present invention described herein. For example, the processor 510 may receive dynamic adjustment information from a local video camera associated with a local subject. The processor 510 may also receive a remote video feed, from a remote video camera, the remote video feed including a remote subject. The processor 510 may then automatically adjust the remote video feed based on the dynamic adjustment information to create an impression that the local subject and the remote subject occupy a shared physical space. The processor 510 may then transmit the adjusted remote video feed to an overlay engine via the communication devices 520.

As used herein, information may be "received" by or "transmitted" to, for example: (i) the rendering engine 500 from other devices; or (ii) a software application or module within rendering engine 500 from another software application, module, or any other source.

As shown in FIG. 5, the storage device 530 also stores camera data 600. One example of such a database 600 that may be used in connection with the rendering engine 500 will now be described in detail with respect to FIG. 6. The illustration and accompanying descriptions of the database presented herein are exemplary, and any number of other database arrangements could be employed besides those suggested by the figures.

FIG. 6 is a tabular representation of a portion of a camera data table 600 in accordance with some embodiments of the present invention. The table 600 includes entries associated with different remote and local camera pairs (designated as RC/LC in FIG. 6). The table 600 also defines fields for each of the entries. The fields might specify a camera identifier, a distance between a camera and a subject, tilt data, zoom data, focus data, field of view data, etc. The information in the database 600 may be periodically created and updated based on information received from, for example, camera operators and/or instrumented cameras. Note that in the embodiment described with respect to FIG. 3, a table 600 associated with only a single remote/local camera pair might be needed by the rendering engine.

Figure 7:
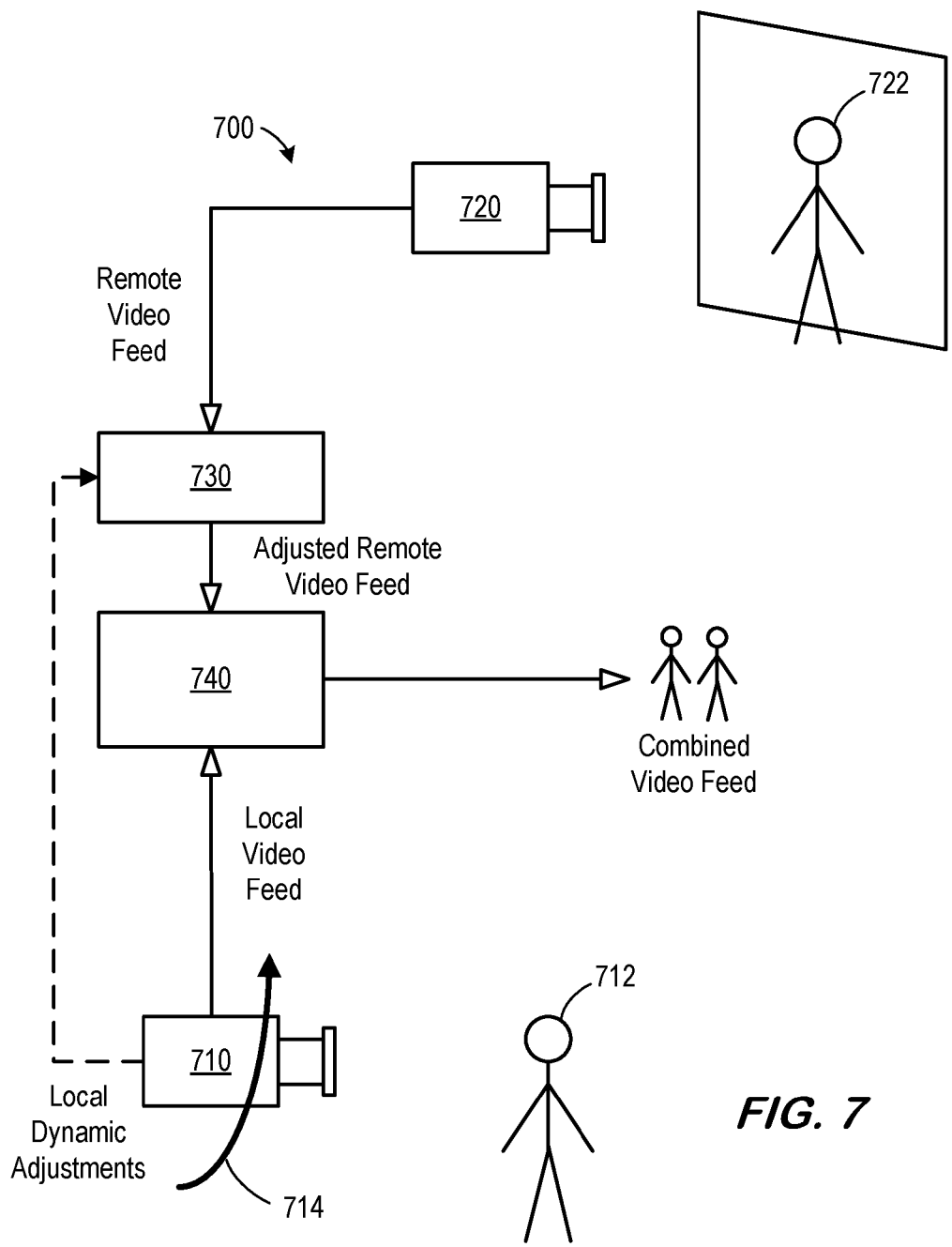
FIG. 7 illustrates a system in accordance with some embodiments of the present invention.

FIG. 7 is a block diagram of a system 700 in accordance with some embodiments of the present invention. The system 700 includes a studio camera 710 aimed at a host 712 of a broadcast program. During an interview, the studio video camera 710 might provide information about dynamic adjustments (e.g., movements of the studio video camera 710) directly to a rendering engine 730 (e.g., a virtual machine and keyer) via a serial interface and/or linked fiber transceivers. According to some embodiments, the studio video camera 710 is a vertical camera mount with integrated inclinometer. Prior to an interview, an operator of the studio video camera 710 might use a tape measure to determine a distance between the host 712 and the studio camera 710 to help determine the width of the video frame (field of view) of the studio camera 710. This information might be entered into the rendering engine 730 to help establish an appropriate position of a remote guest 722 with respect to the studio video camera 710.

The system 700 may also include a remote video camera 720 aimed at the remote guest 722 (e.g., standing in front of a greenscreen). The remote video camera 720 might comprise, for example, a locokoff camera that transmits a remote video HD-SDI feed directly to the rendering engine 730 over a fiber or satellite connection (e.g., a video/audio interview uplink).

The rendering engine 730 may automatically adjust the received remote video HD-SDI feed based on information about dynamic adjustments received from the studio video camera 710 (e.g., the image of the guest 722 may be adjusted when the studio camera pans from left to right). As a result, the output of the rending engine 730 may represent a tracked remote video foreground over greenscreen video signal that may be provided to an overlay engine 740.

The overlay engine 740 may also receive a studio video HD SDI feed (including the studio background) directly from the studio video camera 710 (e.g., which includes a host 712). The overlay engine 740 may then combine the two received video feeds to generate a combined output video feed that creates an impression that the studio subject and the remote subject occupy a shared physical space. With such an arrangement, studio subjects may be immersed into a remote environment (or remote subjects may be placed into the studio environment) with significant flexibility when producing interviews and analysis associated with a remote site.

Some embodiments described herein utilize capabilities of an encoded studio camera system (with or without the addition of a greenscreen area at the remote site or in studio). Note that an identical camera and lens (e.g., non-encoded or motion-controlled) could be used at the remote site as compared to the studio. In some cases, camera data may be synchronized between sites via fiber or network connections. Thus, various combinations of equipment may provide different levels of immersion and/or interaction.

For example, in some cases no greenscreen might be used at either the studio or the remote site. In this case, both cameras may shoot subjects over the actual backgrounds and the two shots may be blended using rendering virtual software along with in-studio camera tracking. This may allow a camera shot of the studio, where the studio subject can be on camera, and when the camera pans to the left or right it will appear as if the remote set is actually present next to the studio set.

As another example, a green screen may by used at the remote site but not at the local site. This may provide the added ability to place the remote subject "virtually" into the studio set. That is, it might appear as if the remote subject was actually standing in the local studio (and possibly next to the actual local subject. As still another example, the local studio set may have a partial greenscreen area such that the studio subject could walk from the actual physical set into the remote environment on the same camera shot. Note that embodiments described herein may require little or no added remote hardware and no additional personnel, while substantially increasing the immersive options.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although a single local subject and single remote subject have been described in some of the examples presented herein, note that any number of subjects may be blended in accordance with the present invention. Similarly, although a single local and remote site have been described herein as examples, note that embodiments could blend together any number of locations. For example, an impression could be created that a first football player located in New York and a second football player located in Chicago are standing next to a studio host located in Connecticut.

Moreover, although specific hardware and data configurations have been described herein, note that any number of other configurations may be provided in accordance with embodiments of the present invention (e.g., some of the information associated with the databases and engines described herein may be split, combined, and/or handled by external systems). Further note that embodiments may be associated with any number of different types of broadcast programs (e.g., sports, news, and weather programs).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method comprising:
   receiving a live studio video feed, from a studio video camera, the studio video feed including a live studio subject image in front of a studio non-solid-colored background;
   receiving a live remote video feed, from a remote video camera, the remote video feed including a live remote subject image in front of a remote non-solid-colored background;
   overlaying in real-time the live remote video feed and the live studio video feed to produce a real-time composite live video signal; and
   after receiving at least one of the live studio video feed and the live remote video feed, automatically adjusting in real-time at least one of the already received live studio video feed and the already received live remote video feed based on real-time information about dynamic adjustments being made to the video camera from which the other live video feed is received, such that the real-time composite live video signal creates an impression that the live studio subject image and the live remote subject image occupy a shared physical space in real-time while retaining their respective backgrounds, and that the remote background is located next to the studio background.

2. The method of claim 1, wherein the video camera from which the other live video feed is received comprises an instrumented camera adapted to provide the real-time information about dynamic adjustments made to the instrumented camera.

3. The method of claim 1, wherein the dynamic adjustments are associated with at least one of: (i) a panning motion, (ii) a tilting motion, (iii) a focal change, or (iv) a zooming adjustment.

4. The method of claim 1, wherein the live remote video feed is received via a high definition serial digital interface signal.

5. The method of claim 4, wherein the high definition serial digital interface signal is received via at least one of: (i) a fiber cable or (ii) a satellite transmission.

6. The method of claim 1, wherein the live remote video feed is automatically adjusted by a real time rendering platform, based on the dynamic adjustments made to an instrumented studio video camera, to create the impression that the live studio subject image and the live remote subject occupy image the shared physical space in real-time.

7. The method of claim 1, wherein the impression created is that the remote subject image is present in the studio subject image's physical space.

8. The method of claim 1, wherein the impression created is that the live studio subject image is present in the live remote subject image's physical space in real-time.

9. The method of claim 2, wherein the live remote video feed is automatically adjusted, based on dynamic adjustments being made to the studio video camera, to create the impression that the live studio subject image and the live remote subject image occupy the shared physical space in real-time; and
   wherein the studio video camera comprises the instrumented camera adapted to provide the real-time information about the dynamic adjustments made to the instrumented camera.

10. The method of claim 2, wherein the live studio video feed is automatically adjusted, based on the dynamic adjustments being made to the remote video camera, to create the impression that the live studio subject image and the live remote subject image occupy the shared physical space in real-time; and
    wherein the remote video camera comprises the instrumented camera adapted to provide the real-time information about the dynamic adjustments made to the instrumented camera.

11. The method of claim 2, wherein the studio video camera comprises the instrumented camera adapted to provide the real-time information about the dynamic adjustments made to the studio video camera; and
    wherein the remote video camera comprises an instrumented camera adapted to provide the real-time information about the dynamic adjustments made to the remote video camera.

12. The method of claim 1, wherein the remote background and the studio background are blended using rendering virtual software.

13. A system, comprising:
    a studio instrumented video camera outputting (i) a live studio video feed including a live studio subject image in front of a studio non-solid-colored background and (ii) real-time data that includes real-time information about dynamic adjustments being made to the studio instrumented video camera;
    a remote video camera outputting a live remote video feed including a live remote subject in front of a remote non-solid-colored background;
    a rendering engine receiving the live remote video feed from the remote video camera and the real-time data that includes the real-time information about the dynamic adjustments from the studio instrumented video camera and generating a real-time adjusted live remote video signal based on the live remote video feed from the remote video camera and the real-time information about the dynamic adjustments; and
    an overlay engine receiving the real-time adjusted live remote video signal and the live studio video feed and generating a real-time combined live output video signal that creates an impression that the live studio subject image and the live remote subject image occupy a shared physical space in real-time while retaining their respective backgrounds, and that the remote background is located next to the studio background.

14. The system of claim 13, wherein the system includes a plurality of studio video cameras and paired remote video cameras, each pair being combined by a separate overlay engine.

15. The system of claim 13, wherein the dynamic adjustments are associated with at least one of: (i) a panning motion, (ii) a tilting motion, (iii) a focal change, or (iv) a zooming adjustment.

16. The system of claim 13, wherein the data associated with dynamic adjustments is provided from the studio video camera to the rendering engine via a serial signal transmitted via fiber transceivers.

17. The system of claim 13, wherein the impression created is that the live remote subject image is present in the live studio subject image's physical space in real-time.

18. The system of claim 13, wherein the impression created is that the live studio subject image is present in the live remote subject image's physical space in real-time.

19. The method of claim 13, wherein the remote background and the studio background are blended using rendering virtual software.

20. A non-transitory computer-readable medium storing instructions adapted to be executed by a processor to perform a method, the method comprising:
receiving a live studio video feed, from a studio video camera, the studio video feed including a live studio subject image in front of a studio non-solid-colored background;
receiving a live remote video feed, from a remote video camera, the remote video feed including a live remote subject image in front of a remote non-solid-colored background;
overlaying in real-time the live remote video feed and the live studio video feed to produce a real-time composite live video signal; and
after receiving at least one of the live studio video feed and the live remote video feed, automatically adjusting in real-time at least one of the already received live studio video feed and the already received live remote video feed based on real-time information about dynamic adjustments being made to the video camera from which the other live video feed is received, such that the real-time composite live video signal creates an impression that the live studio subject image and the live remote subject image occupy a shared physical space in real-time while retaining their respective backgrounds, and that the remote background is located next to the studio background.

21. The method of claim 20, wherein the video camera from which the other live video feed is received comprises an instrumented camera adapted to provide the real-time information about dynamic adjustments made to the instrumented camera.

22. The medium of claim 20, wherein the dynamic adjustments are associated with at least one of: (i) a panning motion, (ii) a tilting motion, (iii) a focal change, or (iv) a zooming adjustment.

23. The method of claim 20, wherein the live remote video feed is automatically adjusted by a real time rendering platform, based on the dynamic adjustments made to an instrumented studio video camera, and the overlaying is performed by an overlay engine, to produce the real-time composite live video signal, which creates the impression that the live studio subject image and the live remote subject occupy image the shared physical space in real-time.

24. The medium of claim 20, wherein the impression created is one of:
(i) that the live remote subject image is present in the live studio subject image's physical space in real-time, or
(ii) that the live studio subject image is present in the live remote subject image's physical space in real-time.

25. The method of claim 20, wherein the remote background and the studio background are blended using rendering virtual software.

26. A method comprising:
receiving a first live video feed, from a first video camera, the first live video feed including a first live subject image in front of a first non-solid-colored background;
receiving a second live video feed, from a second video camera, the second live video feed including a second live subject image in front of a second non-solid-colored background;
receiving a third live video feed, from a third video camera, the third live video feed including a third live subject image in front of a third non-solid-colored background;
overlaying the first live video feed and the second live video feed and the third live video feed to produce a real-time composite live video signal; and
after receiving the first live video feed, automatically adjusting the first live video feed based on real-time information relating to dynamic adjustments being made to the second video camera from which the second live video feed is received, and relating to dynamic adjustments being made to the third video camera from which the third live video feed is received such that the real-time composite live video signal creates an impression that the first live subject image, the second live subject image and the third live subject image all occupy a shared physical space in real-time while retaining their respective backgrounds, and that the first background, the second background and the third background are each located next to at least one of the other backgrounds.

27. The method of claim 26, wherein the first background, the second background and the third background are blended using rendering virtual software.

* * * * *